US008730702B2

(12) United States Patent
Stern

(10) Patent No.: US 8,730,702 B2
(45) Date of Patent: May 20, 2014

(54) VERY HIGH EFFICIENCY THREE PHASE POWER CONVERTER

(75) Inventor: Michael Joseph Stern, Westlake Village, CA (US)

(73) Assignee: Renewable Power Conversion, Inc., San Luis Obispo, CA (US)

( * ) Notice: Subject to any disclaimer, the term of this patent is extended or adjusted under 35 U.S.C. 154(b) by 48 days.

(21) Appl. No.: 12/715,372

(22) Filed: Mar. 1, 2010

(65) Prior Publication Data

US 2010/0226159 A1 Sep. 9, 2010

Related U.S. Application Data

(60) Provisional application No. 61/156,927, filed on Mar. 3, 2009.

(51) Int. Cl.
*H02M 7/5387* (2007.01)
(52) U.S. Cl.
USPC .............................. 363/132; 363/98; 363/131
(58) Field of Classification Search
USPC .................. 363/37, 71, 98, 131, 132
See application file for complete search history.

(56) References Cited

U.S. PATENT DOCUMENTS

| | | | | |
|---|---|---|---|---|
| 4,039,926 A * | 8/1977 | Steigerwald | .................. | 363/138 |
| 4,581,693 A * | 4/1986 | Ueda et al. | ...................... | 363/41 |
| 4,873,826 A * | 10/1989 | Dhar | ......................... | 60/641.14 |
| 5,450,309 A * | 9/1995 | Rohner | ........................... | 363/71 |
| 7,126,294 B2 * | 10/2006 | Minami et al. | ................ | 318/139 |
| 7,692,908 B2 * | 4/2010 | Chen et al. | ..................... | 361/82 |
| 7,733,670 B2 * | 6/2010 | Feng et al. | ....................... | 363/17 |
| 7,872,885 B2 * | 1/2011 | Itkonen et al. | .................. | 363/65 |
| 7,884,588 B2 * | 2/2011 | Adragna et al. | .............. | 323/272 |
| 7,929,325 B2 * | 4/2011 | De Rooij et al. | ................ | 363/71 |
| 7,957,168 B2 * | 6/2011 | Zacharias et al. | ............. | 363/132 |
| 2003/0231518 A1 * | 12/2003 | Peng | .............................. | 363/98 |
| 2004/0174720 A1 * | 9/2004 | Kurokami et al. | ............. | 363/16 |
| 2005/0281067 A1 * | 12/2005 | Deng et al. | .................... | 363/131 |
| 2007/0273338 A1 * | 11/2007 | West | ............................ | 323/222 |
| 2009/0175059 A1 * | 7/2009 | Sakakibara | ...................... | 363/36 |

* cited by examiner

*Primary Examiner* — Jue Zhang
*Assistant Examiner* — Lakaisha Jackson

(57) ABSTRACT

A DC-to-AC power converter is disclosed which provides current regulated three-phase AC outputs and very high conversion efficiencies. The converter sinks power from an external DC current source and steers that current directly into two phases of a three-phase load by using complementary semiconductor switches in disparate half-bridges of a six-pole bridge. The steering switch selection rotates every 60° to direct current into the two phases with the largest voltage differential at any given time. The remaining half-bridge acts as a high-frequency, bi-directional current source to balance the three-phase load currents. This topology and control method significantly reduces power conversion losses. Prior art converters first convert "soft" DC sources to voltage sources and then to AC current sources. The invention eliminates the need for large filter inductors and DC bus capacitors used in prior art converters. The invention is optimized for photovoltaic, utility-grid-interactive applications.

5 Claims, 4 Drawing Sheets

VERY HIGH EFFICIENCY THREE PHASE POWER CONVERTER

This application claims priority of Provisional Application No. 61/156,927

BRIEF SUMMARY OF THE INVENTION

A DC-to-AC power converter is disclosed which provides current regulated three-phase AC outputs and very high conversion efficiencies. The converter sinks power from an external DC current source and steers that current directly into two phases of a three-phase load by using complementary semiconductor switches in disparate half-bridges of a six-pole bridge. The steering switch selection rotates every 60° to direct current into the two phases with the largest voltage differential at any given time. The remaining half-bridge acts as a high-frequency, bi-directional current source to balance the three-phase load currents. This topology and control method significantly reduces power conversion losses. The converter may also include an additional power processing stage that is used to convert an external DC voltage source to a DC current source before the three-phase conversion takes place. Prior art converters first convert "soft" DC sources to voltage sources and then to AC current sources. The invention eliminates the need for large PWM filter inductors and DC bus capacitors used in prior art converters. In addition, 90% of the power being converted is directly processed by steering current into the AC three-phase load without high frequency chopping or switching. The invention is optimized for photovoltaic, utility-grid-interactive applications.

DETAILED DESCRIPTION OF THE INVENTION

Figure 1:
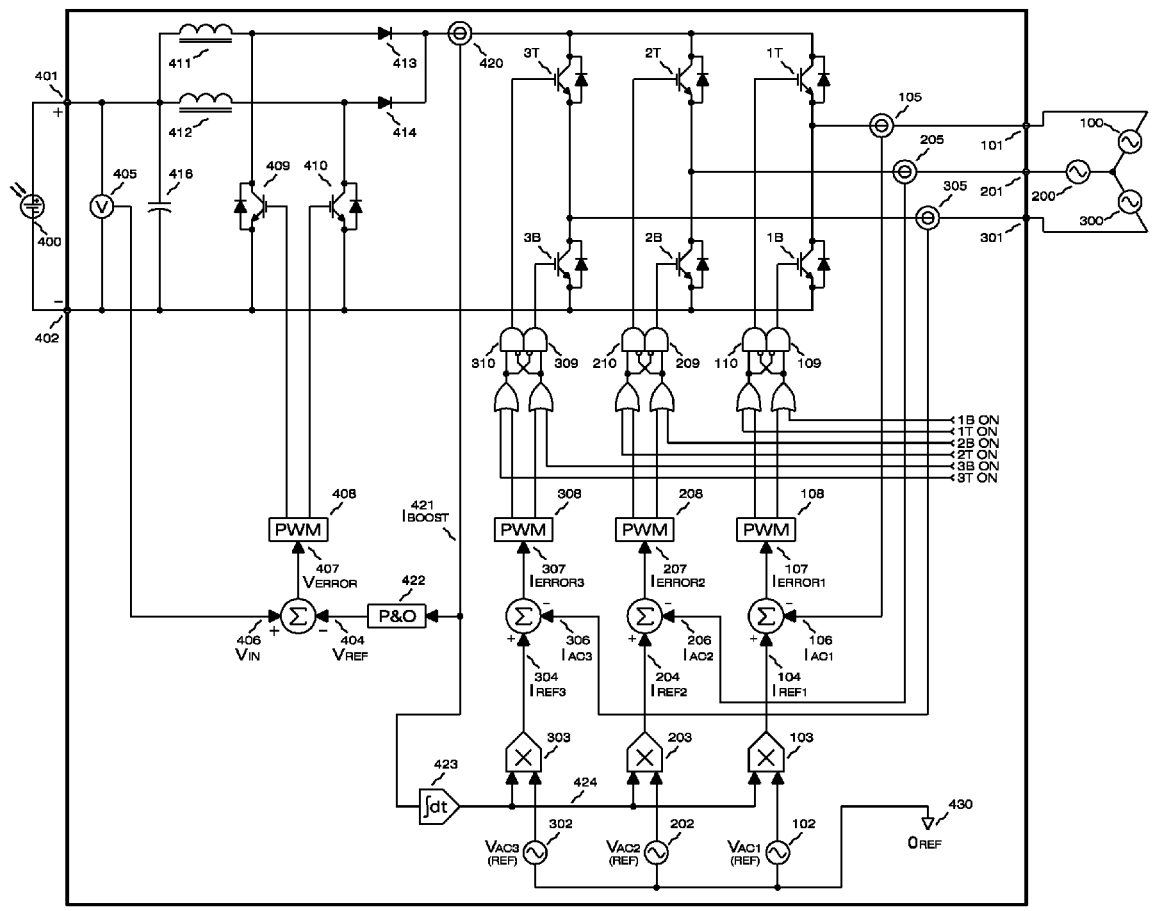
FIG. 1 illustrates the power topology and control methodology for a DC-to-AC power converter, based on the invention, which converts power from a photovoltaic generator to power which is sourced into a 3-phase electric utility grid.

FIG. 1 illustrates the preferred embodiment of the invention. The invention is a DC-to-AC polyphase power converter. Photovoltaic source 400 is connected at power converter input terminals 401 and 402. Energy storage capacitor 416 converts "soft" photovoltaic source 400 into a "hard" voltage source with respect to the boost circuit PWM switching frequencies. Inductor 411, IGBT 409 and rectifier 413 are described as a typical non-isolated boost circuit. An additional boost circuit comprising inductor 412, IGBT 410 and rectifier 414 is connected in parallel. The conduction times of IGBT 409 and IGBT 410 are out of phase so that the operation of the composite boost circuit is interleaved to produce a more constant current at the composite boost circuit inputs and outputs. The conduction times or duty cycle of IGBT 409 and 410 are substantially equal, although phase-shifted at the PWM switching frequency, at any given regulation point. The method of interleaving two boost circuits is known. In operation, voltage sensor 405 senses the voltage across input terminals 401 and 402 to produce signal 406 ($V_{IN}$). Reference voltage 404 ($V_{REF}$) is compared to signal 406 ($V_{IN}$). Both signals 404 and 406 are scaled volt per volt. The difference between signals 404 and 406 is amplified and processed to create signal 407 ($V_{ERROR}$). PWM circuit 408 sets the duty cycle, or conduction time ratio, for IGBT switches 409 and 410 proportional to the magnitude of signal 407 ($V_{ERROR}$). As such, the voltage of photovoltaic source 400 is servo-regulated to the voltage commanded by reference voltage 404 ($V_{REF}$).

In FIG. 1, perturb-and-observe circuit 422 sets an initial (nominal, expected) value of 404 ($V_{REF}$). For a given reference voltage 404 ($V_{REF}$) and set of environmental conditions for photovoltaic source 400, a resultant value of signal 421 ($I_{BOOST}$), as provided by current sensor 420, is had and the initial value is logged. Next, the value of signal 404 ($V_{REF}$) is incrementally stepped and the resultant amplitude of signal 421 ($I_{BOOST}$) is logged and compared to the previous logged value. If signal 421 ($I_{BOOST}$) was increased, signal 404 ($V_{REF}$) is incrementally stepped in the same direction. If decreased, signal 404 ($V_{REF}$) is incrementally stepped in the opposite direction. The maximum power point of photovoltaic source 400 is captured when the maximum amplitude of signal 421 ($I_{BOOST}$) is determined by this iterative, perturb-and-observe algorithm. The perturb-and-observe algorithm is ongoing to dynamically track the maximum power point of photovoltaic source 400 as environmental conditions change.

In FIG. 1, output terminals 101, 201 and 301 of the power converter are connected to an electric utility grid via a dedicated distribution transformer represented by ideal voltage sources 100, 200 and 300. Elements 1T, 1B, 2T, 2B, 3T, 3B are IGBT/anti-parallel diode pairs arranged as a typical six-pole, three-phase bridge. For brevity, each IGBT/anti-parallel diode pair will be simply referred to as an IGBT. Each half-bridge section drives one phase of the electric utility grid. For example, IGBT 1T and 1B connect to output terminal 101 and utility grid phase 100. Current sensors 105, 205 and 305 measures the current out of this half-bridge sections 1T/1B, 2T/2B and 3T/3B and into utility grid phases 100, 200 and 300, respectively. The T or B portion the six IGBT designators refer to the placement of the IGBT switch in the six-pole bridge configuration as either a top (T) switch of bottom (B) switch respectively. In FIG. 1, all reference designators starting with 1, 2 and 3 are associated with utility phases 100, 200 and 300 respectively. The remaining half-bridge sections associated with utility phases 200 and 300 are connected in a similar manner. Signals 102 ($V_{AC1}$), 202 ($V_{AC2}$) and 302 ($V_{AC3}$) are synthesized, low distortion, fixed amplitude sinewaves synchronized with utility grid voltages 100, 200 and 300, respectively. Point 430 is an arbitrary circuit ground reference for the control system. Signals 102 ($V_{AC1}$), 202 ($V_{AC2}$) and 302 ($V_{AC3}$) are multiplied by signal 424 using multiplier circuits 103, 203 and 303 respectively. The signals at the multiplier circuit outputs, 104 ($I_{REF1}$), 204 ($I_{REF2}$) and 304 ($I_{REF3}$) are identical to signals 102 ($V_{AC1}$), 202 ($V_{AC2}$) and 302 ($V_{AC3}$) except changed in amplitude as a linear function of signal 424 amplitude. Signals 104 ($I_{REF1}$), 204 ($I_{REF2}$)

and 304 ($I_{REF3}$) are the sinusoidal references or models for the desired current to be injected into phases 100, 200 and 300 of the utility grid. The current in each phase is regulated, for a portion of each cycle, to its reference value by comparing the reference 104 ($I_{REF1}$), 204 ($I_{REF2}$) and 304 ($I_{REF3}$) to the actual phase current value (feedback), signals 106 ($I_{AC1}$), 206 ($I_{AC2}$) and 306 ($I_{AC3}$) respectively to generate error signals 107 ($I_{ERROR1}$), 207 ($I_{ERROR2}$) and 307 ($I_{ERROR3}$) respectively. Error signals 107 ($I_{ERROR1}$), 207 ($I_{ERROR2}$) and 307 ($I_{ERROR3}$) drive PWM circuits 108, 208 and 308, respectively.

Figure 3:
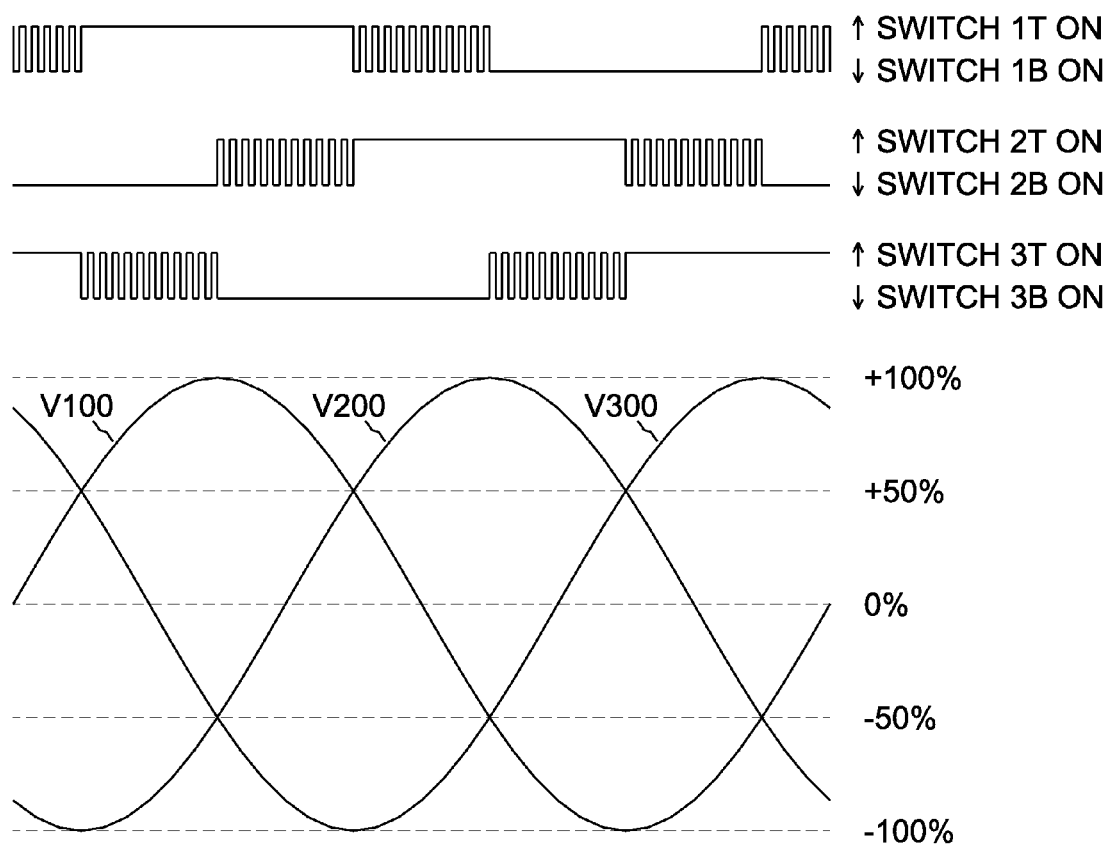
FIG. 3 illustrates the on/off timing of the semiconductor switches which make up the three phase bridge shown in both FIG. 1 and FIG. 2.

In FIG. 1, each phase is driven from its respective PWM circuit in a similar way. For example when zero current is being regulated into phase 100 of the utility grid, gate drives to IGBTs 1T and 1B are switched in complementary fashion, each substantially 50% conduction-time and 50% off-time. To source current into phase 100 when the voltage of phase 100 is positive, the conduction-time to off-time ratio is increased for gate 1T and decreased for gate 1B. To sink current from phase 100 when the voltage on phase 100 is negative, the conduction-time to off-time ratio is decreased for gate 1T and increased for gate 1B. As such, the current is regulated in a servo loop to replicate current reference 104 ($I_{REF1}$) but only when utility voltage 100 is in a voltage window centered around zero from 50% of the negative peak voltage to 50% of the positive peak voltage. When utility voltage 100 is greater than 50% of the positive peak voltage, signal 1T ON goes high, the output of logic gate 110 goes high, driving IGBT 1T on, and logic gate 109 goes low, driving IGBT 1B off. During this time, commands from PWM block 108 are overridden by logic gates 109 and 110. In a similar way, when utility voltage 100 is more negative than 50% of the negative peak voltage, signal 1B ON goes high, the output of logic gate 109 goes high driving IGBT 1B on and logic gate 110 goes low driving IGBT 1T off. When the PWM servo loop is overridden, one IGBT in each of 2-phases will be steering current into (positive) and out of (negative) the utility grid. The basic operation of phase 100 is identical to that of phase 200 with PWM signals 2B ON and 2T ON and associated logic gates 209 and 210 and to that of phase 300 with PWM signals 3B ON and 3T ON and associated logic 309 and 310. FIG. 3 illustrates the timing and essence of this approach.

FIG. 1 shows three AC current regulator servo loops, one for each phase and one DC voltage regulator servo loop that regulates the input voltage of the DC-to-AC converter across terminals 401 and 402. For the AC current loop implementation, signal 424 is the multiplicand, which programs the amplitude of current references 104 ($I_{REF1}$), 204 ($I_{REF2}$) and 304 ($I_{REF3}$). Signal 424 is processed by filter 423 and is a low-pass-filtered analog of the composite boost circuit output current. At any given time, only one of the three AC current servo loop is active and function to make up the current necessary to balance all three phase currents. In operation, the current through current sensor 420 will have a large DC component, a small high frequency ripple component from the boost circuits and a small 360 Hz component. If the 3-phase current balance is perfect, the 360 Hz component will be zero. The average magnitude of signal 421 ($I_{BOOST}$) will be proportional to the RMS value of any AC phase current. Other methods may also be used to derive current references 104 ($I_{REF1}$), 204 ($I_{REF2}$) and 304 ($I_{REF3}$).

FIG. 1 shows a typical six-pole, three-phase bridge topology operating as the DC-to-AC converter polyphase AC current source. Other 3-phase topologies that perform the same function could be used as well.

In FIG. 1 the circuit is described as supplying power to the utility grid at unity power factor. If some mix of real and reactive power is desired, the current steering and AC current regulator PWM timing are still synchronized with the AC line voltages but are shifted out of phase by a number of degrees, plus or minus, to produce a reactive power component.

Figure 2:
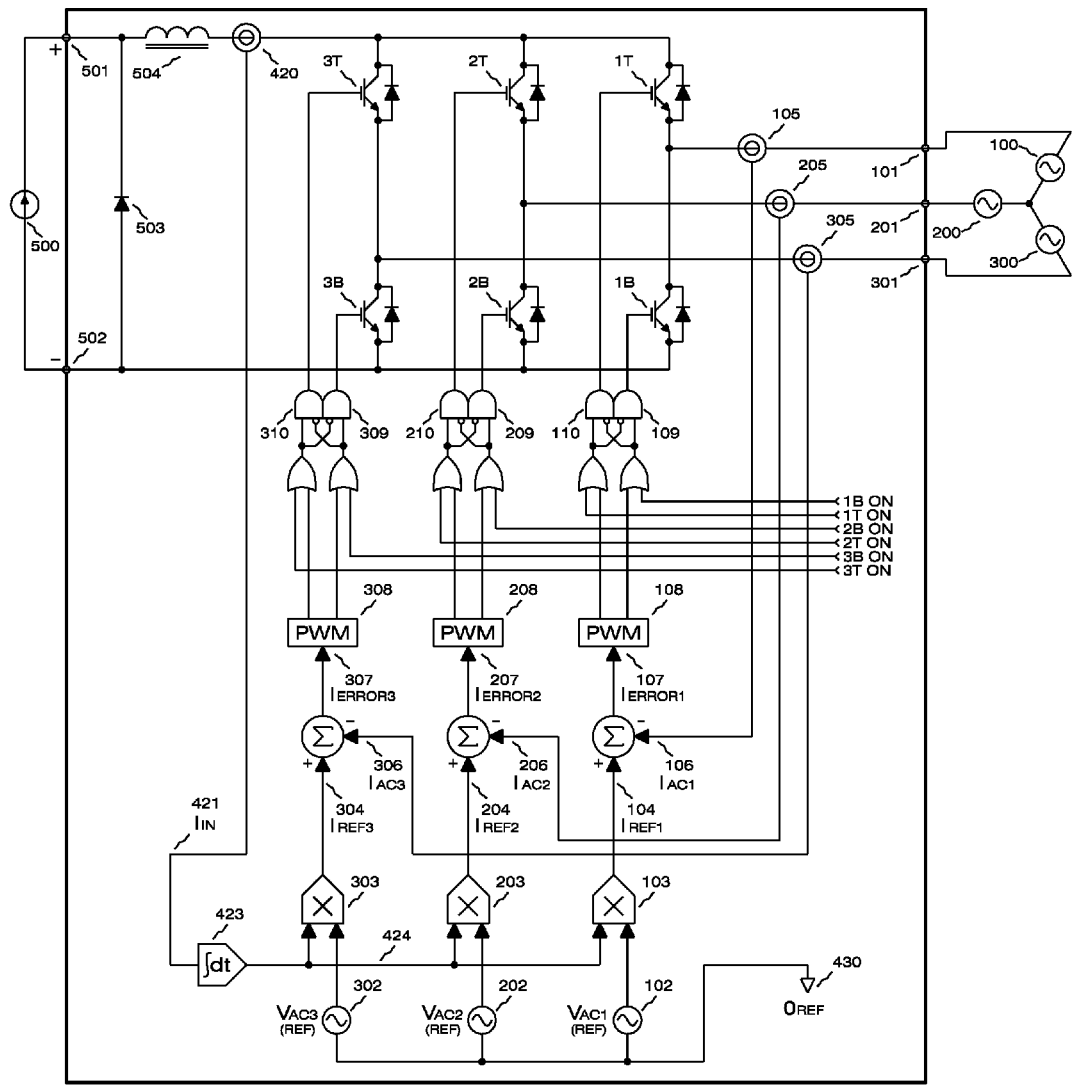
FIG. 2 illustrates the power topology and control methodology for a DC-to-AC power converter, based on the invention, which converts power from a DC current source to power which is sourced into a 3-phase electric utility grid.

FIG. 2 shows an alternate DC-to-AC power converter embodiment where the DC-to-AC inverter does not have a boost circuit as in FIG. 1 and where the input is from DC current source 500 instead of photovoltaic source 400 shown in FIG. 1. In FIG. 2, DC current source 500 connects at terminals 501 and 502. Inductor 504 is used to average the PWM current ripple. Diode 503 is used to freewheel the current through inductor 504. The remainder of the circuit function and reference characters remain the same as that of the circuit disclosed in FIG. 1.

FIG. 3 illustrates the timing of semiconductor switches 1T, 1B, 2T, 2B, 3T and 3B from FIG. 1. These designators reference a given phase and whether the switch is a top switch (T) or bottom switch (B). Complementary switches are not commanded on concurrently but may overlap when changing states without damage since the supply to these switches is a current source. V100, V200 and V300 correspond to the phase voltages 100, 200 and 300 on FIG. 1. When the amplitude of any phase voltage exceeds 50% of its peak value, plus or minus, the top or bottom switch, respectively, for that phase is gated on. When the amplitude of any phase voltage is less than 50% of its peak value, plus or minus, the complementary top and bottom switches for that phase are alternately gated on and off so that the ratio of top switch conduction-time to bottom switch conduction-time tracks the phase voltage sign for that 60° portion of the waveform. At voltage zero cross, this duty cycle ratio is unity to produce a net average current. If the phase voltage is positive, the net conduction-time for the top switch is greater. If the phase voltage is negative, the net conduction-time for the bottom switch is greater. Therefore, at any given time, two of the three half-bridges are controlled to directly steer current into the AC load and the remaining half-bridge functions as a high frequency, bi-directional, switched current source. The current steering is controlled to close each top switch in each half-bridge in rotation with a conduction-time of 120° per switch and controlled to close each bottom switch in each half-bridge in rotation with a conduction-time of 120° per switch. The top switch and bottom switch turn-on times for a given half-bridge are out of phase by 180° so that the three-phase bridge always has a combination of one top switch and one bottom switch in full conduction on disparate half-bridges for 60°. The remaining half-bridge with no switches in continuous conduction during this 60° conduction time of the other two half-bridges is controlled to operate as a high frequency bi-directional current source where the direction and magnitude of the current into the AC load connected to this phase can be controlled by the conduction-time ratio of the top and bottom switches and where the half-bridge section dedicated to function as the high frequency bi-directional current source changes in rotation every 60°.

Figure 4A:
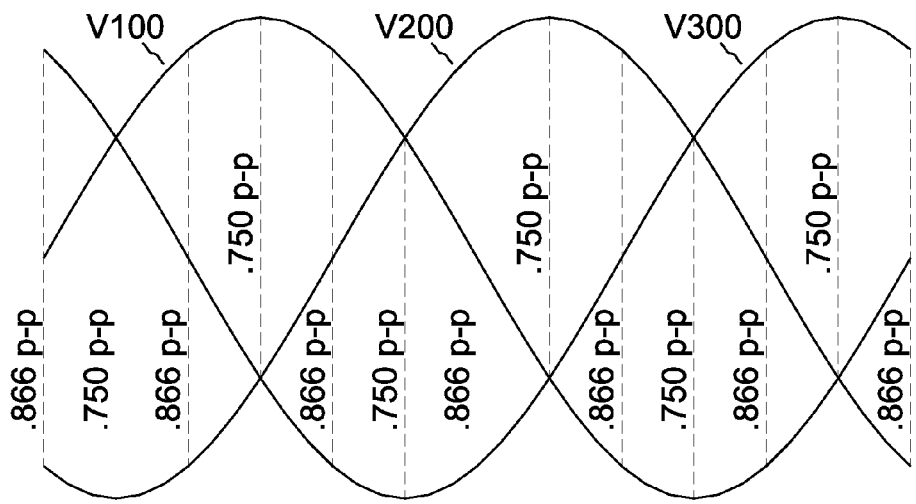
FIG. 4A is for reference and illustrates how the maximum voltage between phases of a balanced 3-phase system oscillates between 75% and 86.6% of the peak-to-peak voltage.
Figure 4B:
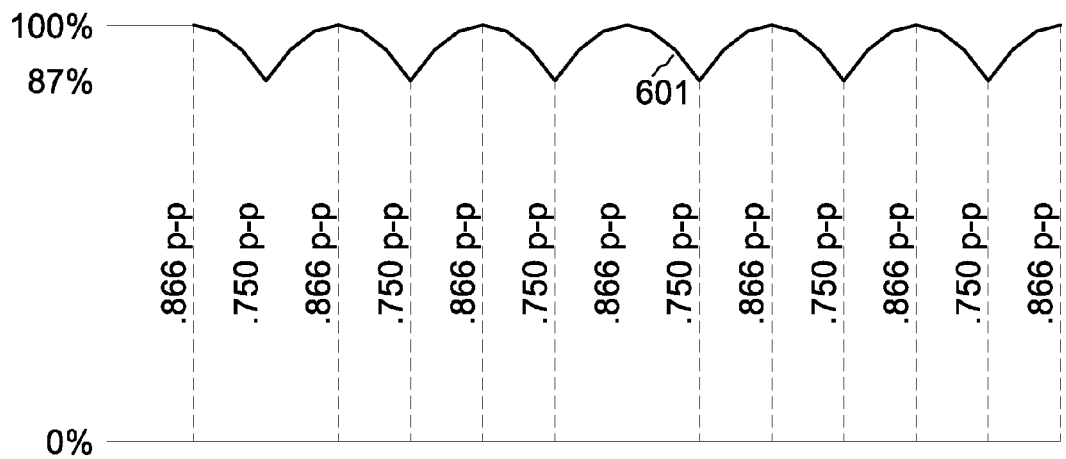
FIG. 4B illustrates the portion of the DC current injected into the utility grid by selectively steering the DC current into the two utility phases with the highest instantaneous differential voltage.
Figure 4C:
FIG. 4C illustrates the portion of the DC current or "makeup" current injected into the utility grid to balance the three phase system where this waveform is shaped by pulse width modulation.

The invention leverages the characteristic of three-phase systems wherein there is always a phase-to-phase voltage difference between two of three phases between 0.75 and 0.866 of the peak-to-peak voltage. When the available boost current is steered in phase with this voltage, power transfer into the utility grid is accomplished. The two phases that share this relationship change every 60°. The phase that is not in conduction for a given 60° period is used to "make up" the required current needed to balance the three phase system. The net make-up power is approximately 10% of the power being converted. In FIG. 4A the maximum phases-to-phase voltage differences are shown by the dotted lines at 30° increments. If the DC source (400 in FIG. 1) is floating with respect to the AC utility load (voltage sources 100, 200 and 300 in FIG. 1) or if the electric utility connection is via delta or ungrounded wye configured transformer windings, then these peak-to-peak voltages can be transposed as shown in FIG. 4B. Waveform 601 is the portion of boost circuit current feeding the rotating 3-phase steering function. In FIG. 4C, waveform 602 is the portion of boost circuit current feeding the rotating 3-phase PWM function. The total current out of the boost circuit in FIG. 1 and into the 6-pole bridge is the sum of waveforms 601 and 602 and is substantially a DC level that varies based on the energy available from the photovoltaic source (400 in FIG. 1).

In another DC-to-AC power converter embodiment, the rotating current steering function is used without the rotating PWM function. At the utility point of connection, a typical prior-art converter is connected in parallel to supply the small amount of power needed to balance the net three-phase current into the utility grid.

Some possible applications for the invention are renewable energy converters, motor drives, uninterruptible power supplies.

In FIG. 2, the DC-to-AC converter disclosed may also be used as an AC-to-DC converter by connecting a DC load in place of current source 500, inverting AC voltage references 102 ($V_{AC1}$), 202 ($V_{AC2}$) and 302 ($V_{AC3}$), adding diodes in series with all IGBTs (opposing the anti-parallel diodes) and removing freewheeling diode 503. Instead of sourcing current into voltage sources 100, 200 and 300, power will be sourced from the utility grid and supplied to the DC load.

This invention is a novel power converter topology and associated regulation method where a DC current source is connected directly to the input of a six-pole bridge as opposed to the prior art where a soft DC source would supply DC bus energy storage capacitors at the input of the six-pole bridge. With prior-art converters, each half-bridge section of the six-pole bridge is pulse-width-modulated at high frequencies and then filtered with three large line filter inductors to integrate the pulse modulation and enable current regulation into an AC load. With the invention, the bulk of the power converted by the six-pole bridge is done at low frequency for a substantial reduction in power conversion losses. In addition, two groups of major power components are eliminated, the line filter inductors and the DC bus capacitors, thereby reducing the cost of the power converter. Also, the invention provides a higher degree of fault tolerance for the six-pole bridge where complementary switches in the same half-bridge can be allowed to cross conduct.

What I claim as my invention is:

1. A DC current source to AC current source power converter apparatus for supplying power to a three-phase AC electrical grid comprising; a DC current source and a means for selectively coupling said DC current source to the three-phase AC electrical grid for a portion of an AC electrical grid cycle synchronized with electrical grid phase voltages and signs for a fixed period on each phase and wherein said means excludes an energy storage capacitor located either directly across the DC current source or effectively across the DC current source, with respect to altering the DC current source impedance as seen by the power converter apparatus and further comprising an inductor in series with said DC current source and a semiconductor switching matrix wherein said semiconductor switching matrix comprises a means for selectively coupling said DC current source directly across two phases of the three-phase AC electrical grid, synchronized with three-phase AC electrical grid phase voltages and signs and wherein said semiconductor switching matrix further comprises a means for regulating current into the remaining third phase of the three-phase AC electrical grid.

2. The DC current source to AC current source power converter apparatus according to claim 1 wherein said DC current source is a photovoltaic current source.

3. A photovoltaic source to AC current source power converter apparatus for supplying power to an AC electrical grid comprising a photovoltaic source, an input capacitor connected across said photovoltaic source, a DC voltage source to DC current source converter stage with an input port across said input capacitor and an output port common with an input port of a semiconductor switching matrix and a means of controlling said semiconductor switching matrix to selectively couple said DC voltage source to DC current source converter stage output port to the AC electrical grid for a portion of an AC grid electrical cycle and wherein said means excludes an energy storage capacitor directly or effectively across the input port of the semiconductor switching matrix and further comprising a means for selectively and directly coupling the DC voltage source to DC current source converter stage output port to each phase of a three-phase electrical grid, synchronized with three-phase electrical grid phase voltages and signs for a rotating 120 degree coupling period per AC electrical grid phase and said photovoltaic source and further comprising a means for selectively coupling said DC voltage source to DC current source converter stage output port and a means for regulating current into the remaining third phase of the three-phase AC electrical grid where said remaining third phase is a phase without direct couplings to said DC voltage source to DC current source converter stage output port at any instant in time.

4. The photovoltaic source to AC current source power converter apparatus for supplying power to an AC electrical grid, according to claim 3, further comprising a means to couple the DC voltage source to DC current source converter stage output port to each phase of a three phase electrical grid, synchronized with electrical grid phase voltages and signs for a fixed period on each phase.

5. The photovoltaic source to AC current source power converter apparatus for supplying power to an AC electrical grid, according to claim 3, further comprising a means to couple the DC voltage source to DC current source converter stage output port to each phase of a three-phase electrical grid, synchronized with electrical grid phase voltages and signs for a rotating 120 degree coupling period per AC electrical grid phase and said photovoltaic source.

* * * * *